(12) United States Patent
Yamai et al.

(10) Patent No.: US 7,804,271 B2
(45) Date of Patent: Sep. 28, 2010

(54) MULTIPHASE CURRENT SUPPLYING CIRCUIT, DRIVING APPARATUS, COMPRESSOR AND AIR CONDITIONER

(75) Inventors: Hiroyuki Yamai, Shiga (JP); Morimitsu Sekimoto, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 448 days.

(21) Appl. No.: 11/792,682

(22) PCT Filed: Nov. 16, 2005

(86) PCT No.: PCT/JP2005/021039

§ 371 (c)(1),
(2), (4) Date: Dec. 3, 2007

(87) PCT Pub. No.: WO2006/061978

PCT Pub. Date: Jun. 15, 2006

(65) Prior Publication Data

US 2008/0211449 A1 Sep. 4, 2008

(30) Foreign Application Priority Data

Dec. 9, 2004 (JP) .............................. 2004-357011

(51) Int. Cl.
 *H02P 27/04* (2006.01)
(52) U.S. Cl. .................. 318/800; 318/801; 318/807
(58) Field of Classification Search .................. 318/800, 318/801, 807, 812; 363/141; 361/410; 307/66
 See application file for complete search history.

(56) References Cited

U.S. PATENT DOCUMENTS 4,975,825 A * 12/1990 Huss et al. .................. 363/141

2004/0232863 A1 11/2004 Takahashi et al.

FOREIGN PATENT DOCUMENTS

| JP | 5-316745 A | 11/1993 |
|----|------------|---------|
| JP | 6-39270 A | 5/1994 |
| JP | 6-209574 A | 7/1994 |
| JP | 10-136674 A | 5/1998 |
| JP | 6-280173 A | 10/1998 |
| JP | 2001-145258 A | 5/2001 |
| JP | 2002-354826 A | 12/2002 |
| JP | 2003-17287 A | 1/2003 |

OTHER PUBLICATIONS

Takahashi, The Institute of Electrical Engineers of Japan, National Conference, 4-149, Mar. 21 2000, pp. 1591.
Itoh et al., The Institute of Electrical Engineers of Japan, Industry Applications Society, national Conference, 95, pp. 445-450, 1998.
Itoh et al., The Institute of Electrical Engineers of Japan National Conference, pp. 5-89, 1989.

* cited by examiner

*Primary Examiner*—Karen Masih
(74) *Attorney, Agent, or Firm*—Birch, Stewart, Kolasch & Birch, LLP.

(57) ABSTRACT

A multiphase current supplying circuit includes a converter, an intervening circuit, an inverter, a control circuit and a lightning arrester. A power supply system is connected to the converter with the lightning arrester interposed therebetween, and the ac voltage is rectified. The intervening circuit includes a capacitor and a bypass connected in parallel thereto. In the bypass, a diode, a resistor and a capacitor are connected in series, and the direction from an anode to a cathode of the diode corresponds to the direction from a high potential side to a low potential side of the smoothing capacitor.

18 Claims, 13 Drawing Sheets

F I G . 4
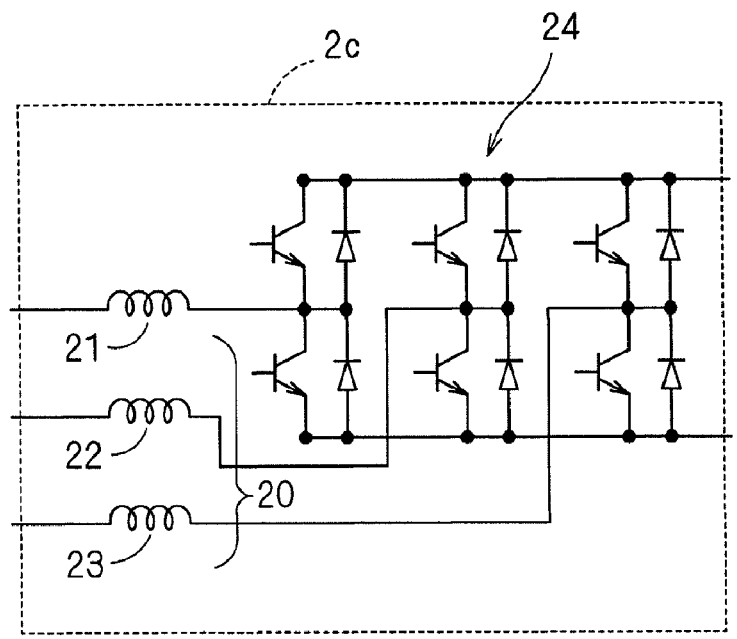
F I G . 5
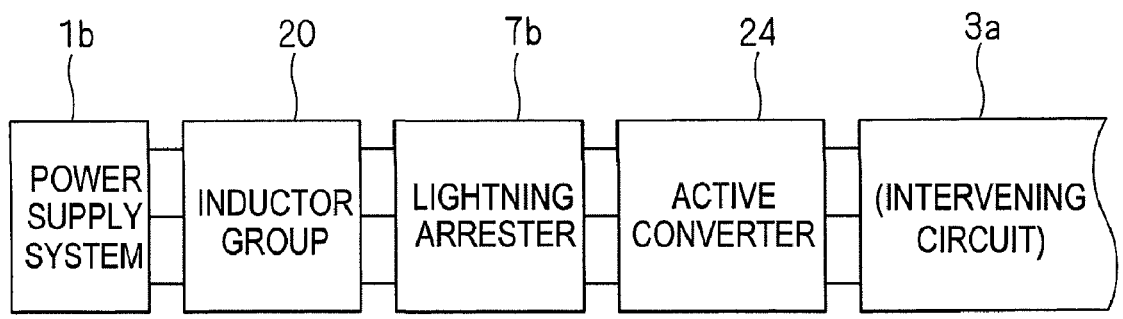

F I G . 8
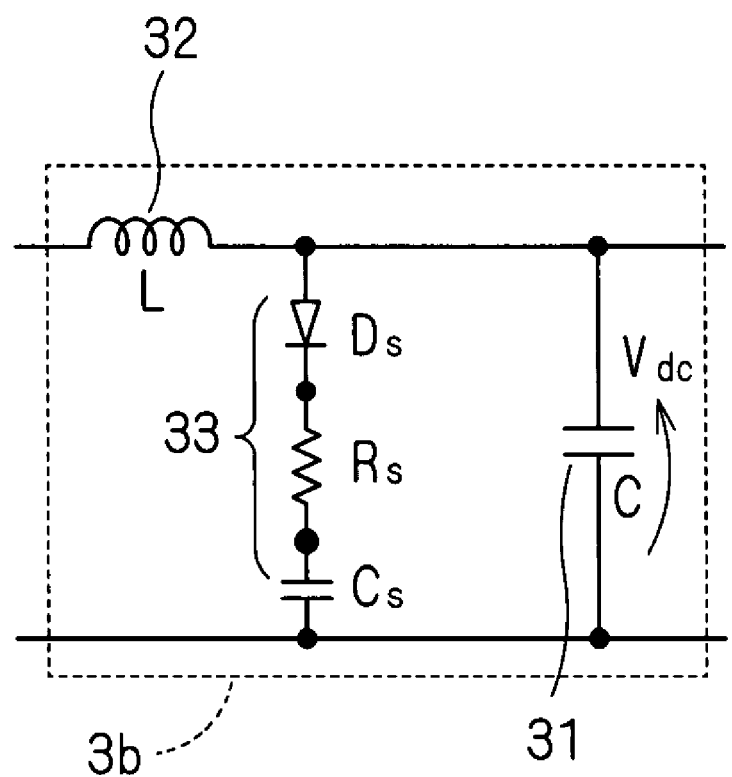

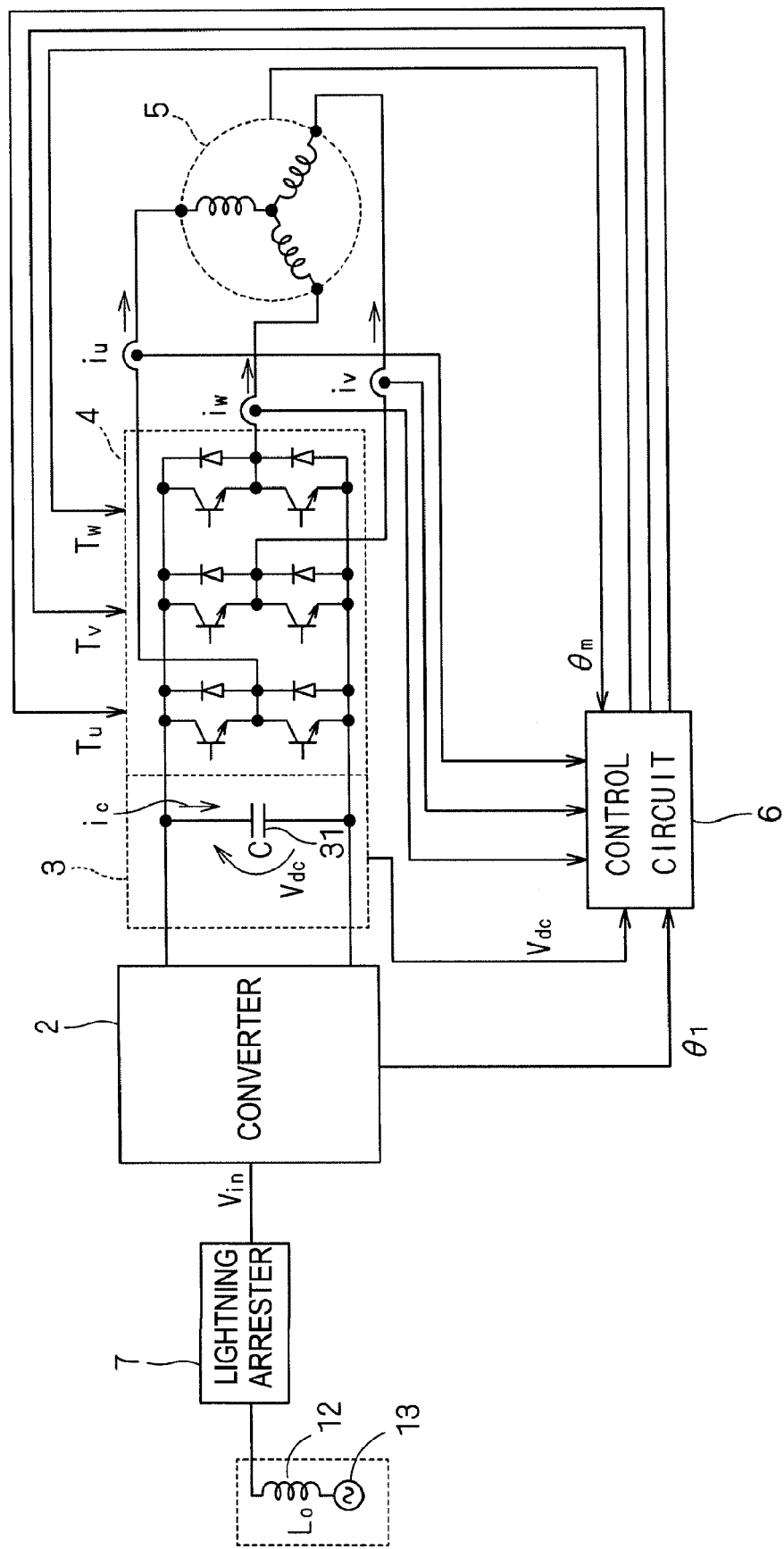
F I G. 1 4

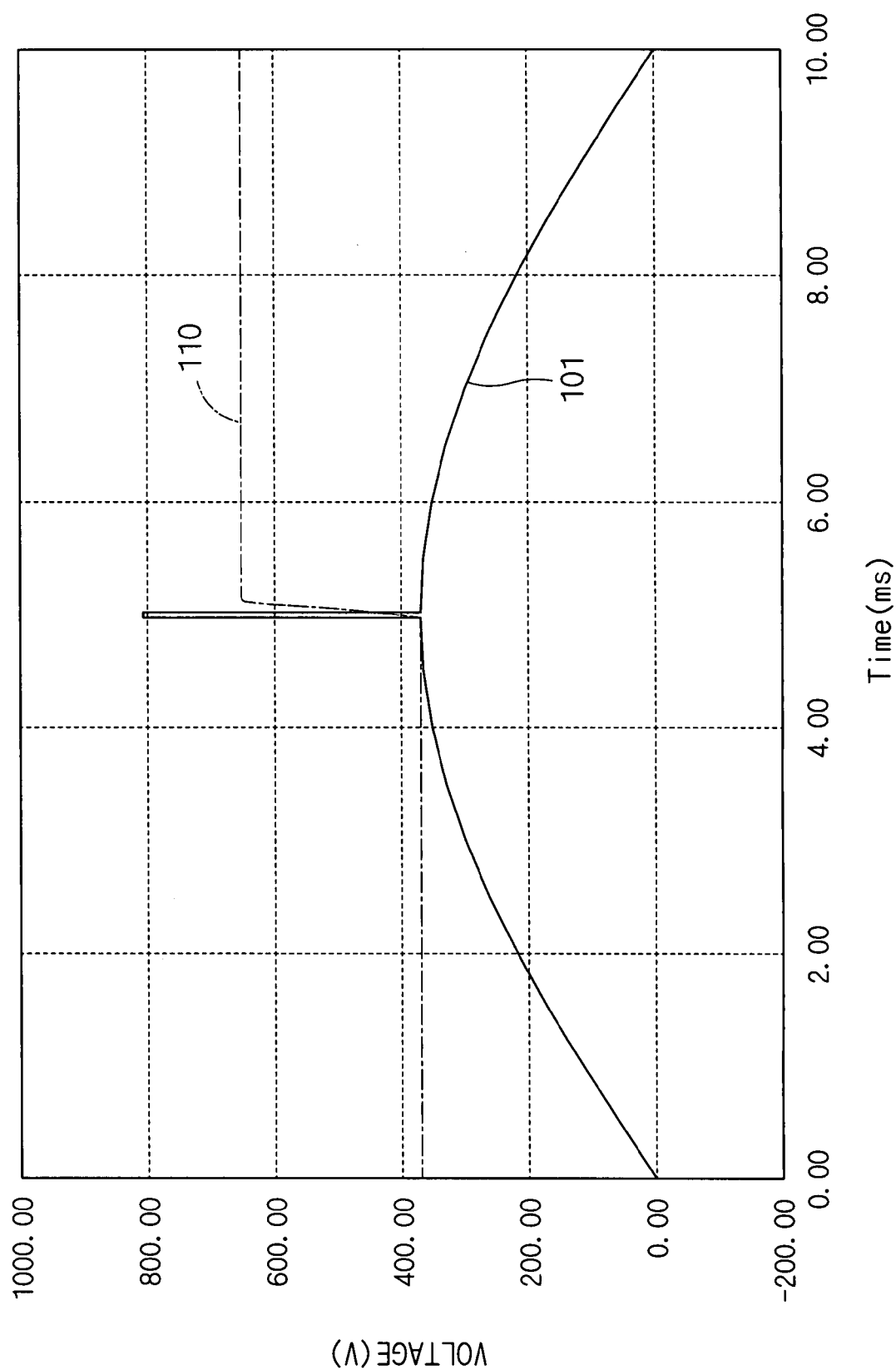

US 7,804,271 B2

MULTIPHASE CURRENT SUPPLYING CIRCUIT, DRIVING APPARATUS, COMPRESSOR AND AIR CONDITIONER

TECHNICAL FIELD

This invention relates to an inverter technique.

BACKGROUND ART

FIG. 11 is a circuit diagram illustrating the configuration of a conventional multiphase current supplying circuit. A power supply system 1 includes a single-phase or multiphase, e.g., three-phase ac power supply 13, and supplies an ac voltage $V_{in}$ to an AC-DC converter (hereinafter briefly referred to as a "converter") 2. An inductance parasitic to the power supply system 1 is shown as an inductor 12 connected in series to the ac power supply 13.

An intervening circuit 3 is interposed between the converter 2 and an inverter 4, and the output of the converter 2 is supplied to the intervening circuit 3. The intervening circuit 3 includes a capacitor 31, and the output of the converter 2 is supplied to the both ends of the capacitor 31. The capacitance C of the capacitor 31 is small, and selectively set at, e.g., 20 µF. The capacitor 31 can be reduced in size by decreasing its capacitance C.

A rectified voltage $V_{dc}$ which is a both-end voltage of the capacitor 31 is input to the inverter 4. In the inverter 4, switching of transistors serving as its switching devices of the inverter 4 is carried out on the basis of switching signals $T_u$, $T_v$ and $T_w$ obtained from a control circuit 6. As a result, three-phase currents $i_u$, $i_v$, $i_w$ are thereby supplied to a motor 5.

The control circuit 6 is supplied with a phase $\theta_1$ of the ac voltage $V_{in}$, rectified voltage $V_{dc}$, currents $i_u$, $i_v$, $i_w$, and a rotation position angle $\theta_m$ of a rotor of the motor 5. These respective quantities can be detected using a well-known technique. On the basis of these quantities, the control circuit 6 generates the switching signals $T_u$, $T_v$ and $T_w$.

A technique is publicly known which extremely reduces the capacitance C of the capacitor 31 and appropriately controls the switching signals $T_u$, $T_v$ and $T_w$ on the basis of the above-mentioned respective quantities, to thereby carry out AC-AC conversion. Such switching control will herein be called capacitorless inverter control. The capacitorless inverter control allows size reduction of the whole circuit including the capacitor and inverter to achieve cost reduction, as compared with an ordinary circuit with the intervening circuit 3 replaced by smoothing circuit 301 or 302 (shown in FIGS. 12 and 13, respectively). While the smoothing circuit 301 employs a smoothing large-capacitance capacitor CC and a power factor correction reactor LL, the capacitorless inverter control can suppress a reduction in power factor on the power supply side without using such power factor correction reactor LL. In the case of using a single-phase power supply, the smoothing circuit 302 is further provided with a diode DD and a transistor QQ serving as a switching device to constitute a chopper circuit in order to reduce higher harmonics of the power supply, however, the capacitorless inverter control can suppress higher harmonics of the power supply without using the chopper circuit.

Single-phase capacitorless inverter control is disclosed in, for example, Non-patent document 1. In Non-patent document 1, a rectified voltage which greatly pulsates at a frequency almost twice that of a single-phase ac power supply is applied to an inverter, but a three-phase ac current is output by appropriate control of switching in the inverter. Non-patent document 1 shows that, in the single-phase capacitorless inverter control, the power factor takes an excellent value of 97% or higher where the maximum value of the both-end voltage of a capacitor is not lower than twice the minimum value thereof.

Three-phase capacitorless inverter control is disclosed in, for example, Non-patent document 2. In Non-patent document 2, a rectified voltage which pulsates at a frequency six times that of a three-phase ac power supply is applied to an inverter, but a three-phase ac current is output by appropriate control of switching in the inverter. Non-patent document 2 shows that, in the three-phase capacitorless inverter control, the power factor takes an excellent value of 95.5% or higher where the minimum value of the both-end voltage of a capacitor is not higher than $3^{1/2}/2$ times the maximum value thereof.

Further, Non-patent document 3 discloses capacitorless inverter control having a three-phase active converter. Non-patent document 3 shows that appropriate control of switching of the active converter can stabilize the both-end voltage of a capacitor, and further, can suppress higher harmonics of a power supply.

Non-patent document 1: Isao Takahashi "Inverter Controlling Method for a PM Motor having a Diode Rectifying Circuit with a High Input Power Factor" The Institute of Electrical Engineers of Japan, National Conference in 2000, 4-149 (March 2000), p. 1591

Non-patent document 2: Yoichi Ito, Isao Takahashi "Capacitorless PWM inverter" 1988, The Institute of Electrical Engineers of Japan, Industry Applications Society, National Conference, pp. 445-450

Non-patent document 3: Yoichi Ito, Isao Takahashi, Fumiaki Hachiboshi, Kazuhiko Tanaka "Capacitorless PWM inverter (Study on PWM Control Technique)" 1989, The Institute of Electrical Engineers of Japan, National Conference, pp. 5-89 to 5-90.

In the power supply system 1 of the multiphase current supplying circuit employing the capacitorless inverter control as described above, a case where a lightning surge is superimposed is assumed. Therefore, it is desirable to take measures for lightning protection in the power supply system 1.

FIG. 14 is a circuit diagram showing the configuration where a lightning arrester 7 is interposed between the power supply system 1 and converter 2 in the multiphase current supplying circuit shown in FIG. 11. The converter 2 receives the ac voltage $V_{in}$ via the lightning arrester 7. Here, the lightning arrester 7 serves as a peak-value suppressor for suppressing a surge voltage superimposed on the ac voltage $V_{in}$.

Damage that the inverter 4 receives when a lightning surge is superimposed in the power supply system 1 will be considered. FIG. 15 is a graph showing a waveform 101 of the ac voltage $V_{in}$ and a waveform 110 of the rectified voltage $V_{dc}$. Herein, simulation was run in the case where one phase of the ac power supply 13 (when the ac power supply 13 is a single-phase ac power supply, its output) generated a sinusoidal voltage having a frequency of 50 Hz and an effective value of 270 V, and a lightning surge of several thousands of volts with a width of 50 µs occurred near the peak of the sinusoidal voltage. While an inductance $L_0$ of the parasitic inductor 12 may actually vary by regional power distribution conditions (the lengths of power lines and difference in leakage inductance of transformers), 230 µH was employed in this simulation. For the capacitance C of the capacitor 31, 20 µF was employed. The ac voltage $V_{in}$ was assumed to be clamped at 800 V by the lightning arrester 7. For simplification, the simulation was run in the case where the inverter 4 was on standby (when an active converter is provided, the active converter, too), and the motor 5 was not supplied with current ($i_u=i_v=i_w=0$).

The waveform 110 of the rectified voltage $V_{dc}$ almost coincided with the peak value ($2^{0.5} \times 270V$) of the ac voltage $V_{in}$ until immediately before superposition of the lightning surge, but increased by slightly over 250 V after the superimposition, and the peak value exceeded 600 V. Shown is the simulation where the motor 5 was not supplied with current (when the inverter 4 was on standby, for example), the waveform with the rectified voltage $V_{dc}$ maintained in magnitude is shown. However, this problem about the peak value occurs even when the motor 5 is supplied with current.

In the case where the power supply is a 200V system, components having a breakdown voltage of about 600 V are often selected as the transistor to be used in the inverter circuit 4 for the purpose of its size reduction. Accordingly, there is a high possibility that the superimposition of a lightning surge, even when the lightning arrester 7 reduces the value, on the ac voltage $V_{in}$ as shown in FIG. 15 may cause serious damage on the inverter circuit 4.

Such phenomenon, however, does not cause great damage on the inverter circuit 4 in the case where the capacitance C of the capacitor 31 is large. FIG. 16 is a graph showing the waveform 101 of the ac voltage $V_{in}$ and a waveform 111 of the rectified voltage $V_{dc}$. The graph of FIG. 16 shows the results of simulation employing 900 µF for the capacitance C of the capacitor 31, unlike in the graph of FIG. 15. In this case, the rectified voltage $V_{dc}$ rose to as low as four hundred and several tens of volts while the ac voltage $V_{in}$ reached as high as 800 V.

This is considered because, as the capacitance C decreases, a charging current $i_c$ flown into the capacitor 31 via the converter 2 by the lightning surge causes a higher voltage to be generated at the capacitor 31. In other words, to carry out the capacitorless inverter control having the above-described advantages, a voltage rise in the capacitor 31 due to the lightning surge needs to be suppressed.

DISCLOSURE OF INVENTION

This invention has been made in view of such problems, and has an object to provide a technique capable of achieving capacitorless inverter control with the capacitance of a capacitor in an intervening circuit significantly reduced even when a lightning surge is superimposed.

A first aspect of a multiphase current supplying circuit of this invention comprises: a peak-value suppressor (7) connected to an ac power supply (13) outputting an ac voltage ($V_{in}$), the peak-value suppressing device suppressing a surge voltage superimposed on the ac voltage; a converter (2) receiving the ac voltage from the ac power supply via the peak-value suppressing device and rectifying the ac voltage; a capacitor (31) receiving an output of the converter; a first bypass (33) connected in parallel to the capacitor; and an inverter (4) receiving a both-end voltage ($V_{dc}$) of the capacitor and outputting multiphase ac currents ($i_u$, $i_v$, $i_w$). The first bypass includes a series connection of a resistive element ($R_s$) and a capacitive element ($C_s$).

According to a second aspect of the multiphase current supplying circuit of this invention, in the first aspect, the first bypass (33) further includes a diode ($D_s$) connected in series to the resistive element ($R_s$) and the capacitive element ($C_s$). A direction from an anode to a cathode of the diode coincides with a direction from a high potential side to a low potential side of the capacitor.

A third aspect of the multiphase current supplying circuit of this invention comprises: a peak-value suppressor (7) connected to an ac power supply (13) outputting an ac voltage ($V_{in}$), the peak-value suppressing device suppressing a surge voltage superimposed on the ac voltage; a converter (2) receiving the ac voltage from the ac power supply via the peak-value suppressing device and rectifying the ac voltage; a capacitor (31) receiving an output of the converter; a first bypass (33) connected in parallel to the capacitor; and an inverter (4) receiving a both-end voltage ($V_{dc}$) of the capacitor and outputting multiphase ac currents ($i_u$, $i_v$, $i_w$). The first bypass includes a series connection of a diode ($D_s$) and a capacitive element ($C_s$), and a direction from an anode to a cathode of the diode coincides with a direction from a high potential side to a low potential side of the capacitor.

A fourth aspect of the multiphase current supplying circuit of this invention comprises: a peak-value suppressor (7) connected to an ac power supply (13) outputting an ac voltage ($V_{in}$), the peak-value suppressing device suppressing a surge voltage superimposed on the ac voltage; a converter (2) receiving the ac voltage from the ac power supply via the peak-value suppressing device and rectifying the ac voltage; a capacitor (31) receiving an output of the converter; a first bypass (33) connected in parallel to the capacitor; and an inverter (4) receiving a both-end voltage ($V_{dc}$) of the capacitor and outputting multiphase ac currents ($i_u$, $i_v$, $i_w$). The first bypass conducts when the both-end voltage ($V_{dc}$) exceeds a first predetermined value and non-conducts when the both-end voltage falls below a second predetermined value not higher than the first predetermined value.

According to a fifth aspect of the multiphase current supplying circuit of this invention, in the fourth aspect, the first bypass (34) includes a resistor ($R_B$) and a switch (Q) connected in series to each other. The switch turns on when the both-end voltage ($V_{dc}$) exceeds the first predetermined value, and the switch turns off when the both-end voltage falls below the second predetermined value.

A sixth aspect of the multiphase current supplying circuit of this invention, in the fourth or fifth aspect, further comprises a second bypass (33) connected in parallel to the capacitor (31). The second bypass includes a series connection of a resistive element ($R_s$) and a capacitive element ($C_s$).

According to a seventh aspect of the multiphase current supplying circuit of this invention, in the sixth aspect, the second bypass (33) further includes a diode ($D_s$) connected in series to the resistive element ($R_s$) and the capacitive element ($C_s$). A direction from an anode to a cathode of the diode coincides with a direction from a high potential side to a low potential side of the capacitor.

According to an eighth aspect of the multiphase current supplying circuit of this invention, in the fourth or fifth aspect, the second bypass includes a series connection of a diode ($D_s$) and a capacitive element ($C_s$), and a direction from an anode to a cathode of the diode coincides with a direction from a high potential side to a low potential side of the capacitor.

A ninth aspect of the multiphase current supplying circuit of this invention, in any one of the first to eighth aspects, further comprises an inductor (21, 22, 23; 32) connected in series to the parallel connection of the capacitor (31) and the first bypass (33; 34).

According to a tenth aspect of the multiphase current supplying circuit of this invention, in any one of the first to ninth aspects, the ac power supply (13) is a single-phase ac power supply, the converter (2) is a single-phase full-wave rectifying diode bridge (2a), and a maximum value of the both-end voltage is not lower than twice a minimum value of the both-end voltage.

An eleventh aspect of the multiphase current supplying circuit of this invention, in any one of the first to ninth aspects, the ac power supply (13) is a three-phase ac power supply, the converter (2) is a three-phase full-wave rectifying diode bridge (2b), and a minimum value of the both-end voltage is not higher than $3^{1/2}/2$ times a maximum value of the both-end voltage.

According to a twelfth aspect of the multiphase current supplying circuit of this invention, in any one of the first to ninth aspects, the ac power supply (13) is a three-phase ac power supply, and the converter (2) includes a three-phase active converter (24).

A thirteenth aspect of the multiphase current supplying circuit of this invention, in the twelfth aspect, further comprises an interconnected reactor (20) interposed between the ac power supply (13) and the active converter (24).

According to the first to ninth aspects of the multiphase current supplying circuit of this invention, the capacitorless inverter control is carried out with the capacitance of the capacitor significantly reduced even when a lightning surge is superimposed.

Particularly according to the second, third, seventh and eighth aspects, power consumption in the normal operation is reduced by the diode.

Particularly according to the fourth to eighth aspects of the multiphase current supplying circuit of this invention, the both-end voltage is controlled not to exceed the first predetermined value even when a lightning surge is superimposed.

Particularly according to the fifth aspect of the multiphase current supplying circuit of this invention, the resistor is connected in parallel to the capacitor when the both-end voltage exceeds the first predetermined value, which decreases the speed of charging of the capacitor and suppresses a rise in the both-end voltage.

Particularly according to the ninth aspect of the multiphase current supplying circuit of this invention, the peak value of the both-end voltage of the capacitor is reduced even when a lightning surge is superimposed.

Particularly according to the tenth and eleventh aspects of the multiphase current supplying circuit of this invention, the capacitor is reduced in value and size.

According to the twelfth and thirteenth aspects of the multiphase current supplying circuit of this invention, the occurrence of higher harmonics is suppressed.

A driving apparatus comprising the multiphase current supplying circuit according to any one of the first to thirteenth aspects of this invention and a motor supplied with the multiphase ac currents can be obtained.

A compressor comprising the above-described driving apparatus and driven by this can be obtained.

An air conditioner comprising the above-described compressor and performing cooling or heating using a coolant compressed by the compressor can be obtained.

These and other objects, features, aspects and advantages of this invention will become more apparent from the following detailed description and accompanying drawings.

BRIEF DESCRIPTION OF DRAWINGS

FIG. 4 is a circuit diagram showing a configuration of a converter.

FIG. 5 is a block diagram showing a modification of the first embodiment of this invention.

FIG. 8 is a circuit diagram showing an intervening circuit according to a second embodiment of this invention.

FIG. 14 is a circuit diagram illustrating a configuration of a multiphase current supplying circuit provided with a lightning arrester.

FIGS. 15 and 16 are graphs each showing the operation of the multiphase current supplying circuit provided with the lightning arrester.

BEST MODE FOR CARRYING OUT THE INVENTION

First Embodiment

Figure 1:
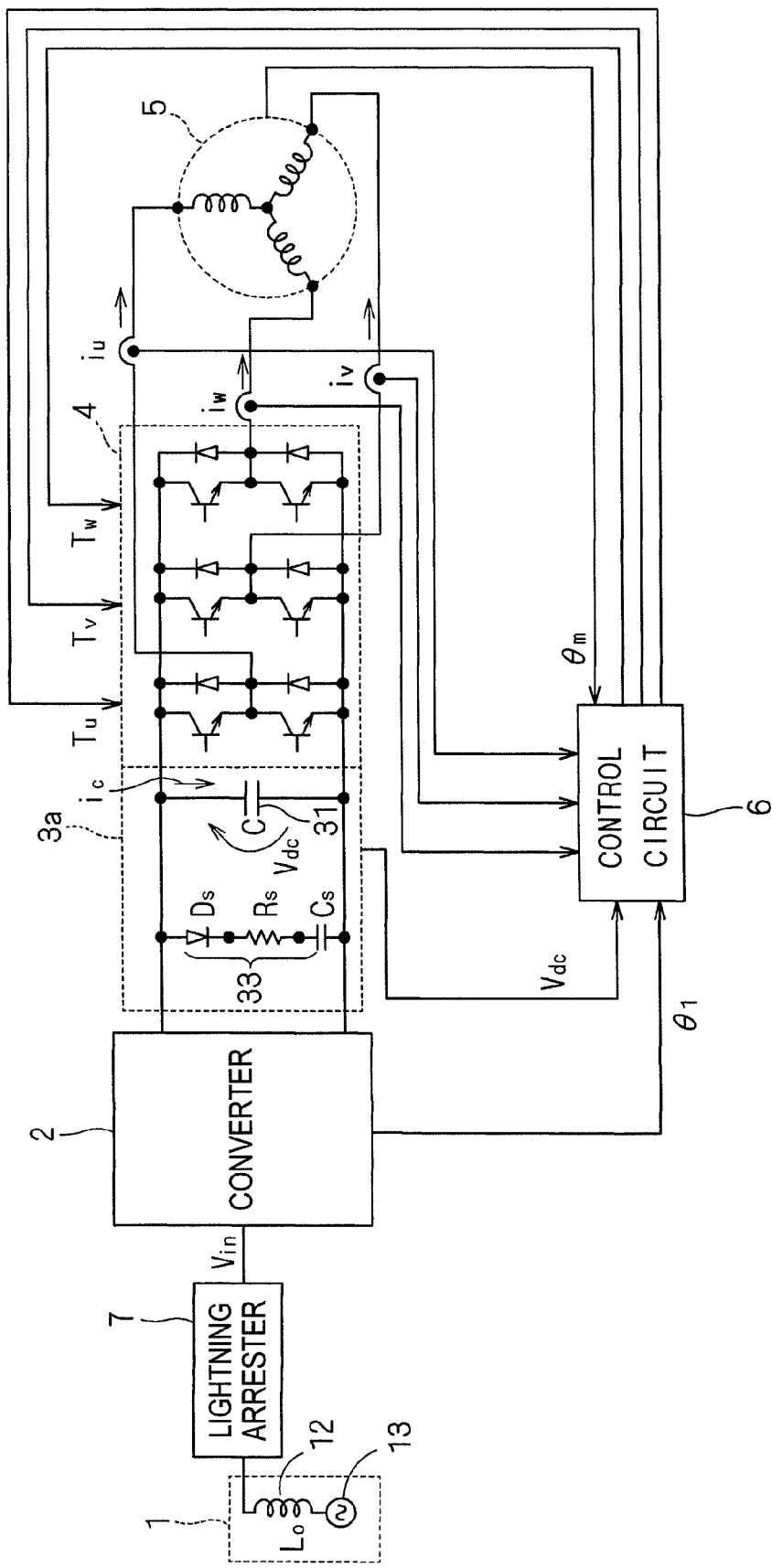
FIG. 1 is a circuit diagram showing a driving apparatus according to a first embodiment of this invention.

FIG. 1 is a circuit diagram showing a driving apparatus according to the first embodiment of this invention. The driving apparatus is provided with a motor 5 serving as a driving part and a multiphase current supplying circuit for supplying multiphase currents thereto.

The multiphase current supplying circuit includes a converter 2, an intervening circuit 3a, an inverter 4, a control circuit 6 and a lightning arrester 7. A single-phase or a multiphase, e.g., three-phase power supply system 1 is connected to the converter 2 with the lightning arrester 7 interposed therebetween, and the ac voltage $V_{in}$ is rectified. Since a parasitic inductance exists in the power supply system 1 as described above, the parasitic inductance is shown as an inductor 12 connected in series to an ac power supply 13. A value of 230 μH was employed as the parasitic capacitance $L_O$ of each phase.

The converter 2 rectifies the ac voltage $V_{in}$ and inputs it to the intervening circuit 3a. The intervening circuit 3a includes a capacitor 31 and a bypass 33 connected in parallel thereto. And the rectified voltage $V_{dc}$ which is the both-end voltage of the capacitor 31 is output to the inverter 4.

Figure 2:
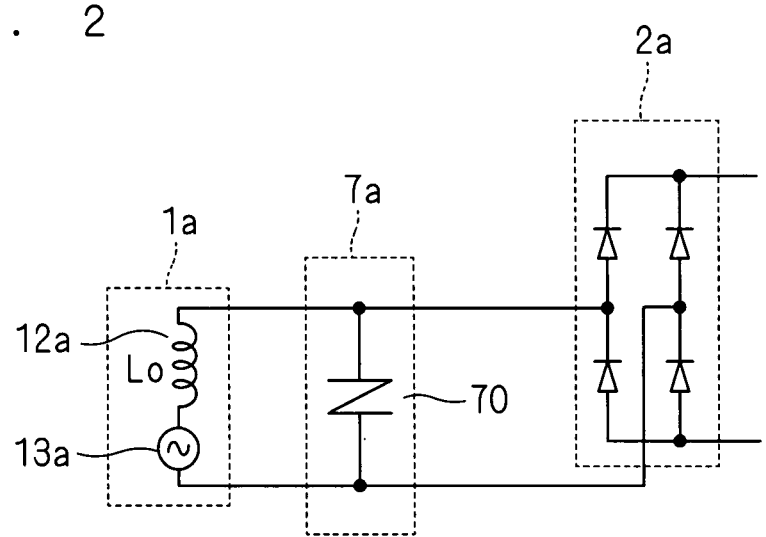
FIGS. 2 and 3 are circuit diagrams each showing a configuration applicable to this invention.

FIG. 2 is a circuit diagram illustrating a configuration of a power supply system 1a, a converter 2a and a lightning arrester 7a, all being a single-phase type, that can be employed as the power supply system 1, converter 2 and lightning arrester 7.

The power supply system 1a is shown as including a single-phase ac power supply 13a and a parasitic inductor 120a. The lightning arrester 7a includes a protecting element 70 connected in parallel to the power supply system 1a. A varistor can be employed as the protecting element 70. The converter 2a is composed of a single-phase full-wave rectifying diode bridge.

Figure 12:
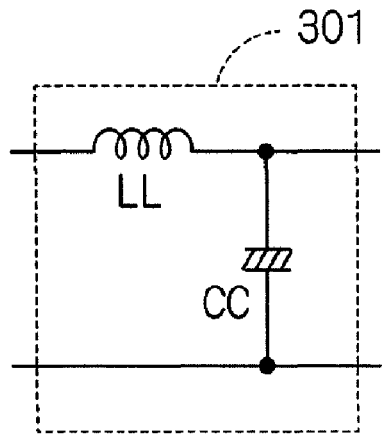
FIGS. 12 and 13 are circuit diagrams each illustrating a configuration of a conventional smoothing circuit.
Figure 13:
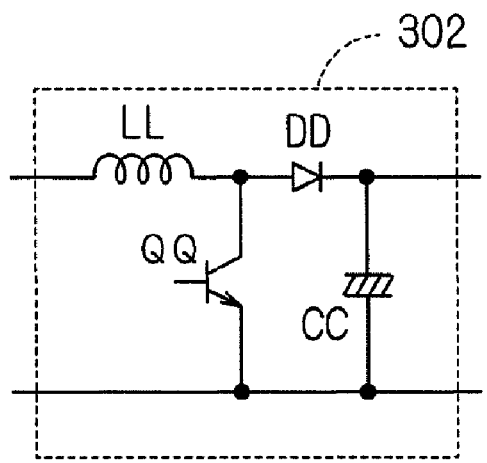

In the case where such single-phase alternating current is used as a power supply, the capacitance C of the capacitor 31 is set such that the rectified voltage $V_{dc}$ greatly pulsates at a frequency almost twice that of the ac voltage $V_{in}$, and the maximum value of the rectified voltage $V_{dc}$ is not lower than twice the minimum value thereof, as described in Non-patent document 1. The capacitance C is set at 20 μF, for example. This capacitance is very small as compared to the capacitance (e.g., 900 μF) employed in the smoothing circuits 301 and 302 (shown in FIGS. 12 and 13, respectively).

Figure 3:
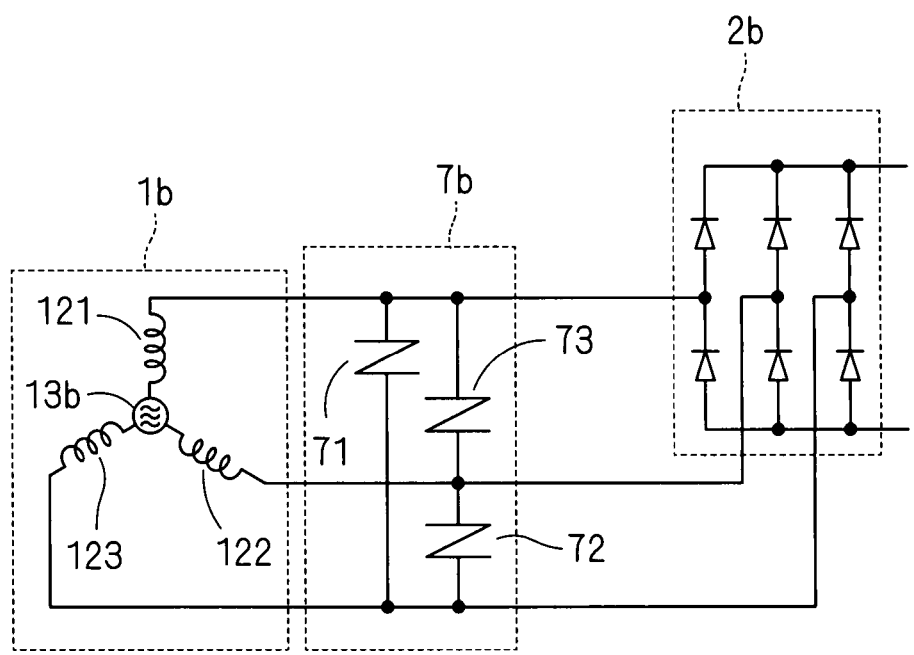

FIG. 3 is a circuit diagram illustrating a configuration of a power supply system 1b, a converter 2b and a lightning arrester 7b, all being a three-phase type, that can be employed as the power supply system 1, converter 2 and lightning arrester 7.

The power supply system 1b is shown as including a single-phase ac power supply 13b and parasitic inductors 121, 122 and 123 for the respective phases. The lightning arrester 7b includes protecting elements 71, 72 and 73 interposed between the respective phases of the power supply system 1b. A varistor can be employed as the protecting elements 71, 72 and 73. The converter 2b is composed of a three-phase full-wave rectifying diode bridge.

In the case of performing full-wave rectification using such three-phase alternating current as a power supply, the capacitance of the capacitor 31 is set such that the rectified voltage $V_{dc}$ pulsates at a frequency six times that of the ac voltage $V_{in}$ and the minimum value of the rectified voltage $V_{dc}$ is not higher than $3^{1/2}/2$ times the maximum value of the rectified voltage $V_{dc}$, as described in Non-patent document 2. The capacitance C is set at 20 μF, for example. This capacitance is very small as compared to the capacitance (e.g., 900 μF) employed in the smoothing circuits 301 and 302 (shown in FIGS. 12 and 13, respectively).

FIG. 4 is a circuit diagram illustrating a configuration of a converter 2c that can be used in place of the converter 2b. The converter 2c includes an inductor group 20 generally called an interconnected reactor and an active converter 24.

The inductor group 20 has inductors 21, 22 and 23 for the respective phases, and the inductors 21, 22 and 23 are connected in series to the parasitic inductors 121, 122 and 123, respectively.

The active converter 24 has three transistors (upper-arm side transistors) each having a collector connected to one end of the capacitor 31 and three transistors (lower-arm side transistors) each having an emitter connected to the other end of the capacitor 31. Each of the upper-arm side transistors is paired with each of the lower-arm side transistors in each phase. The emitter of an upper-arm side transistor and the collector of a lower-arm side transistor paired with each other are connected at a connection node, and their connection nodes are respectively connected to the power supply system 1b in the respective phases with the inductors 21, 22 and 23 interposed therebetween.

On/off switching of each of the upper-arm side transistors and lower-arm side transistors is controlled by the control circuit 6.

Each of the upper-arm side transistors and lower-arm side transistors is provided with a freewheeling diode having an anode connected to the emitter and a cathode connected to the collector.

Employing such converter 2c can suppress the occurrence of higher harmonics as compared to the case of employing the converters 2a and 2b which simply performs full-wave rectification.

In view of the functions of the interconnected reactor, the inductor group 20 does not absolutely need to be provided for the converter 2c, but may be provided in a position closer to the power supply system 1b. FIG. 5 is a block diagram showing such modification. The inductor group 20, lightning arrester 7b and active converter 24 are connected in this order from the power supply system 1b, and the intervening circuit 3a is connected to the power supply system 1b with these interposed therebetween.

In the case of employing the active converter 24 in this manner, appropriately controlling the converter as described in Non-patent document 3 can stabilize the both-end voltage of the capacitor 31 even when the capacitance C of the capacitor 31 is set small, and further, can reduce higher harmonics of the power supply. The capacitance C is set at 20 μF, for example. This capacitance is very small as compared to the capacitance (e.g., 900 μF) employed in the smoothing circuits 301 and 302 (shown in FIGS. 12 and 13, respectively).

In the bypass 33 of the intervening circuit 3a, a diode $D_s$, a resistor $R_s$ and a capacitor $C_s$ are connected in series, and the direction from an anode to a cathode of the diode $D_s$ coincides with the direction from a high potential side to a low potential side of the capacitor 31. FIG. 1 illustrates the case in which the anode of the diode $D_s$ is connected to one end of the capacitor 31 on the high potential side, the cathode of the diode $D_s$ is connected to one end of the resistor $R_s$, the other end of the resistor $R_s$ is connected to one end of the capacitor $C_s$, and the other end of the capacitor $C_s$ is connected to one end of the capacitor 31 on the low potential side. The order of the diode $D_s$, resistor $R_s$ and capacitor $C_s$ constituting a series circuit may be interchanged.

The inverter 4 supplies the three-phase currents $i_u$, $i_v$ and $i_w$ to the motor 5. The currents $i_u$, $i_v$ and $i_w$ correspond to the U, V and W phases, respectively. The inverter 4 has three transistors (upper-arm side transistors) each having a collector connected to one end of the capacitor 31 and three transistors (lower-arm side transistors) each having an emitter connected to the other end of the capacitor 31. Each of the upper-arm side transistors is paired with each of the lower-arm side transistors in each phase. The emitter of an upper-arm side transistor and the collector of a lower-arm side transistor paired with each other are connected at a connection node, and the currents $i_u$, $i_v$ and $i_w$ are output from their connection nodes, respectively. On/off switching of each of the upper-arm side transistors and lower-arm side transistors is controlled on the basis of the switching signals $T_u$, $T_v$ and $T_w$ from the control circuit 6. The switching signals $T_u$, $T_v$ and $T_w$ correspond to the U, V and W phases, respectively.

Each of the upper-arm side transistors and lower-arm side transistors is provided with a freewheeling diode having an anode connected to the emitter and a cathode connected to the collector.

The control circuit 6 is supplied with the phase $\theta_1$ of the ac voltage $V_{in}$, rectified voltage $V_{dc}$ occurring at the both ends of the capacitor 31, currents $i_u$, $i_v$, $i_w$, and rotation position angle (mechanical angle) $\theta_m$ of a rotor of the motor 5. These respective quantities can be detected using a well-known technique. On the basis of these quantities, the control circuit 6 generates the switching signals $T_u$, $T_v$ and $T_w$.

Figure 6:
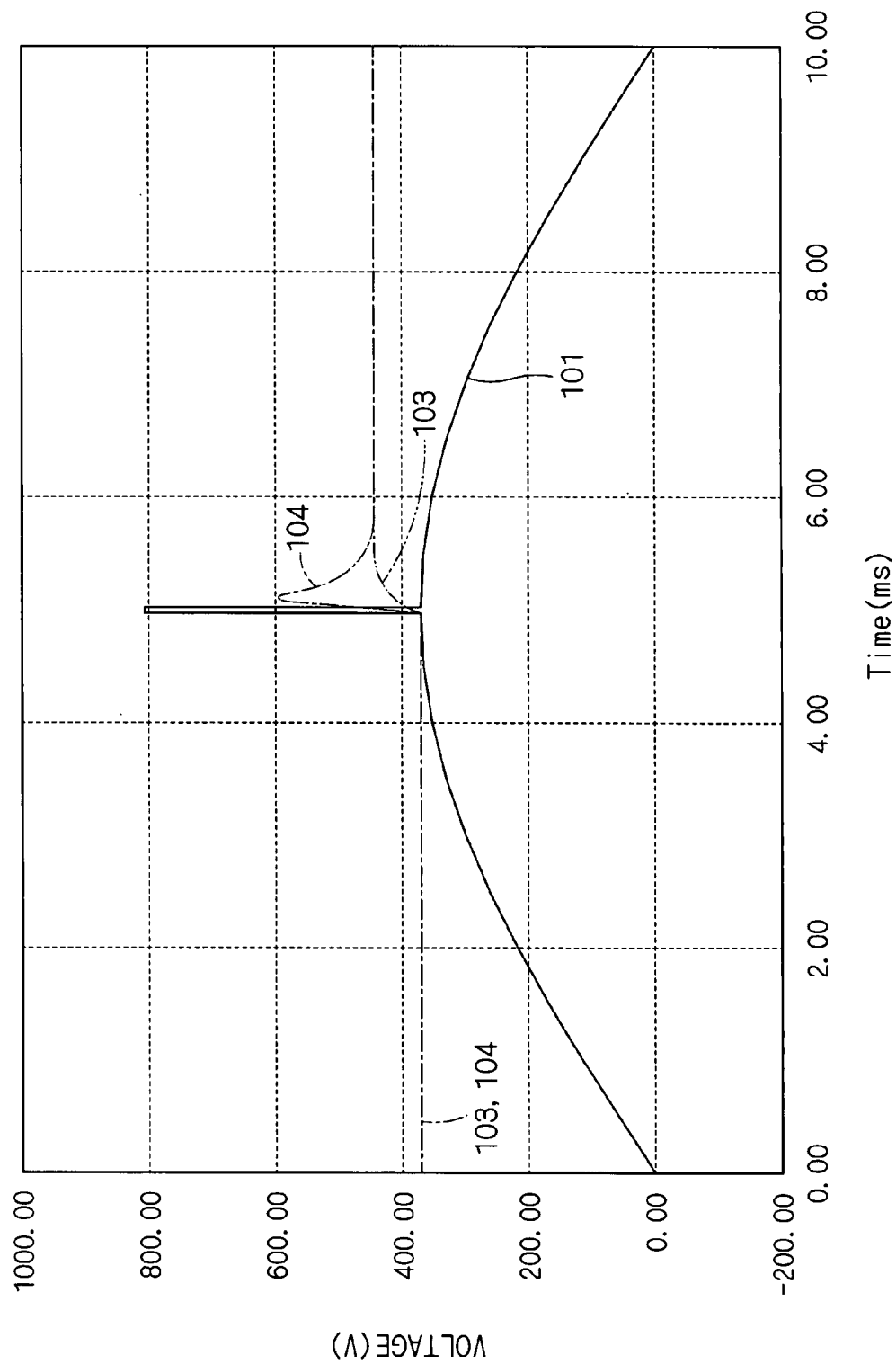
FIG. 6 is a graph showing the operation in the first embodiment of this invention.
Figure 16:
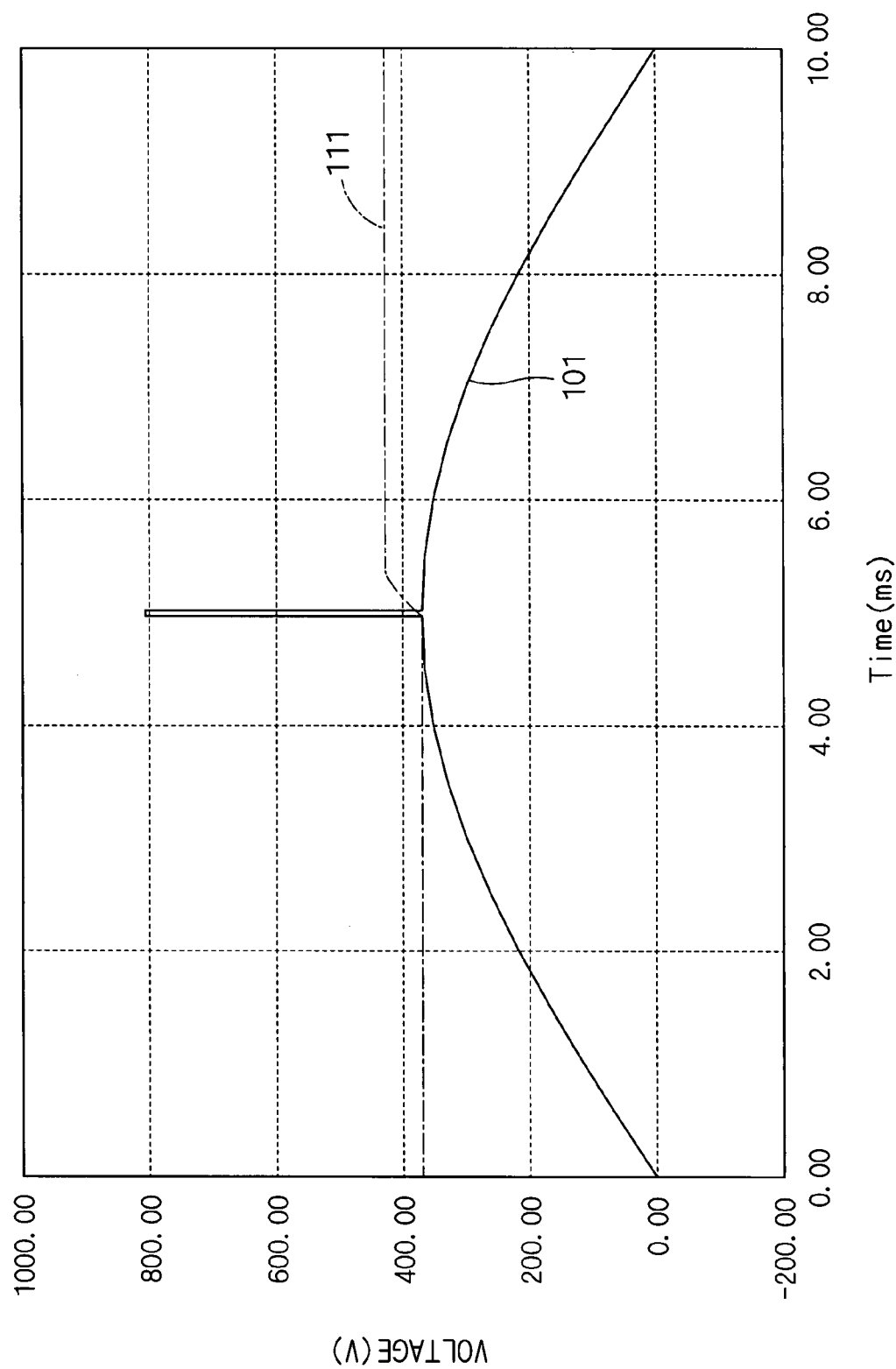

FIG. 6 is a graph showing a waveform 101 of the ac voltage $V_{in}$, a waveform 103 of the both-end voltage of the capacitor $C_s$ and a waveform 104 of the rectified voltage $V_{dc}$. There is provided no interconnected reactor, and the simulation was run under the same conditions as those in the simulation from which the graph shown in FIG. 15 was obtained, except that the bypass 33 is provided. As to the specifications of the bypass 33, the resistance of the resistor $R_s$ was set at 10Ω, and the capacitance of the capacitor $C_s$ was set at 100 μF. Such bypass 33 can be reduced in size as compared to the capacitor 31 having a capacitance of 900 μF employed in the simulation from which the graph shown in FIG. 16 was obtained.

Now, the waveform 103 of the both-end voltage of the capacitor $C_s$ and waveform 104 of the rectified voltage $V_{dc}$ coincided with the peak value ($2^{0.5}$×270V) of the ac voltage $V_{in}$ until immediately before the occurrence of the lightning surge, but not only the capacitor 31 but also the capacitor $C_s$ is charged via the diode $D_s$ when the lightning surge occurs and the ac voltage $V_{in}$ abruptly increases to reach 800 V. The current charging the capacitor $C_s$ flows via the resistor $R_s$.

Accordingly, the rise in the rectified voltage $V_{dc}$ indicated by the waveform 104 is steeper than the rise in the both-end voltage of the capacitor $C_s$ indicated by the waveform 103. The charging current $i_c$ flown into the capacitor 31 in this embodiment can be made smaller than the charging current $i_c$ flown into the capacitor 31 in the intervening circuit 3 (FIG. 14) by the charging current flowing into the capacitor $C_s$. Therefore, the rectified voltage $V_{dc}$ does not reach 600 V.

Since the simulation shown here was run in the case where the motor 5 is not supplied with current, the waveform with the rectified voltage $V_{dc}$ maintained in magnitude is shown. However, in the case where the motor 5 is supplied with current, the rectified voltage $V_{dc}$ drops to return to a normal operation value.

The both-end voltage of the capacitor $C_s$ maintains its voltage after being brought into agreement with the rectified voltage $V_{dc}$. This is because the potential on the cathode side of the diode $D_s$ on the basis of the both-end voltage of the capacitor $C_s$ is higher than the potential on the anode side of the diode $D_s$ on the basis of the rectified voltage $V_{dc}$.

In view of the above-described operation, the diode $D_s$ is not absolutely necessary. In capacitorless inverter control with a converter composed only of a diode bridge (cf. FIG. 2 or FIG. 3), however, the rectified voltage $V_{dc}$ greatly pulsates when current is flown into the motor 5. Therefore, the both-end voltage of the capacitor $C_s$ also greatly pulsates when the bypass 33 is not provided with the diode $D_s$. This results in charging/discharging of the capacitor $C_s$ in a normal operation, and causes the occurrence of losses at the resistor $R_s$. Therefore, it is desirable that the diode $D_s$ be provided for the bypass 33 in order to reduce power consumption at the resistor $R_s$ in the normal operation.

Figure 7:
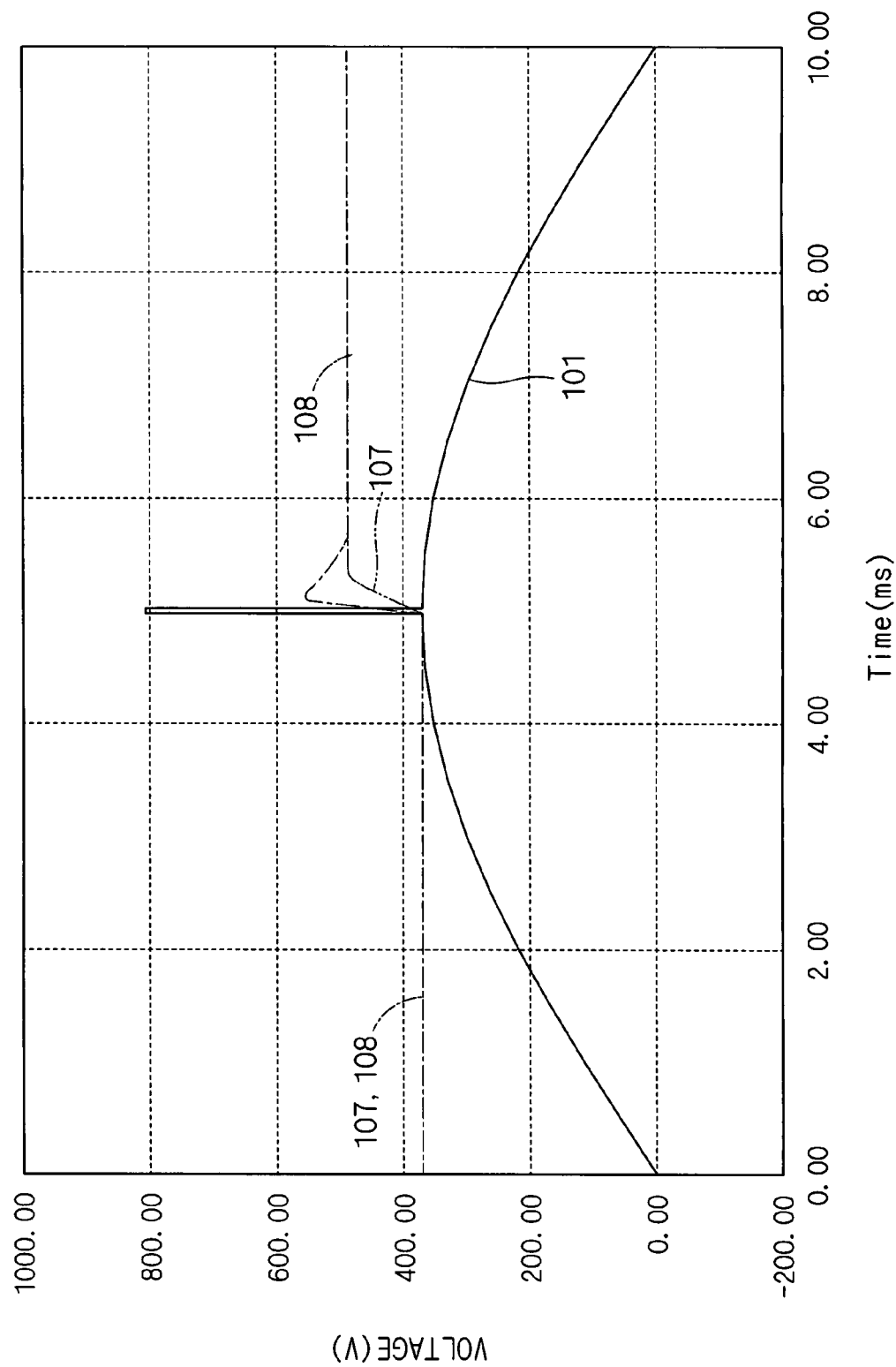
FIG. 7 is a graph showing the operation in a modification of the first embodiment of this invention.

On the other hand, the capacitor $C_s$ is charged quickly when the bypass 33 is not provided with the resistor $R_s$, which increases the amount of current flown into the bypass 33. This in result can suppress a rise in the rectified voltage $V_{dc}$ more efficiently. FIG. 7 is a graph showing the operation in the case where the resistor $R_s$ is removed and the bypass 33 is composed only of the capacitor $C_s$ and diode $D_s$, as a modification of the first embodiment of this invention. The both-end voltage of the capacitor $C_s$ is indicated by a waveform 107, and the rectified voltage $V_{dc}$ is indicated by a waveform 108.

Although not considered in the simulation, internal losses occur at the capacitor $C_s$. Therefore, in the case where the diode $D_s$ is connected, the both-end voltage of the capacitor $C_s$ risen after the application of lightning surge drops with a time constant due to the internal losses at the capacitor $C_s$, and eventually, coincides with the maximum value of the rectified voltage $V_{dc}$ (without considering a surge). When this time constant is to be reduced, a charging resistor or the like may be connected across the capacitor $C_s$.

In this modification, the both-end voltage of the capacitor $C_s$ is higher than in the case of providing the resistor $R_s$. It is desirable to provide the bypass 33 with the resistor $R_s$ having the function of suppressing an abnormal rise in the both-end voltage of the capacitor $C_s$, and hence, the both-end voltage of the capacitor 31 due to a transient phenomenon at power-on.

As described above, the capacitor 31 apparently increases its capacitance when a lightning surge occurs, and functions at an original capacitance C in a normal operation. Accordingly, the capacitorless inverter control can be performed with the capacitance C of the capacitor 31 significantly reduced even when a lightning surge is superimposed. Further, the capacitance of the capacitor $C_s$ may be smaller than that of the capacitor CC employed in the conventional configuration shown in FIG. 12 or 13 (e.g., 900 μF). Considering that the capacitor $C_s$ branches the charging current at the capacitor 31 to suppress the voltage rise, the capacitance of the capacitor $C_s$ may be smaller than that of the capacitor CC though not smaller than that of the capacitor 31, and may be reduced to about 100 μF, for example. Therefore, the capacitor $C_s$ does not significantly run counter to size reduction of the intervening circuit.

Second Embodiment

FIG. 8 is a circuit diagram showing an intervening circuit 3b employed in a driving apparatus according to a second embodiment of this invention. The intervening circuit 3b is configured with an inductor 32 further added to the intervening circuit 3a. Specifically, the inductor 32 is connected in series to the parallel connection of the capacitor 31 and bypass 33. Employing the intervening circuit 3b as the intervening circuit 3 shown in FIG. 1 not only allows the bypass 33 to exert its function, but also decreases the rising angle of current flown into the parallel connection of the capacitor 31 and bypass 33 by the inductor 32. This can suppress with more efficiency the voltage rise in the rectified voltage $V_{dc}$ when a lightning surge occurs.

Figure 9:
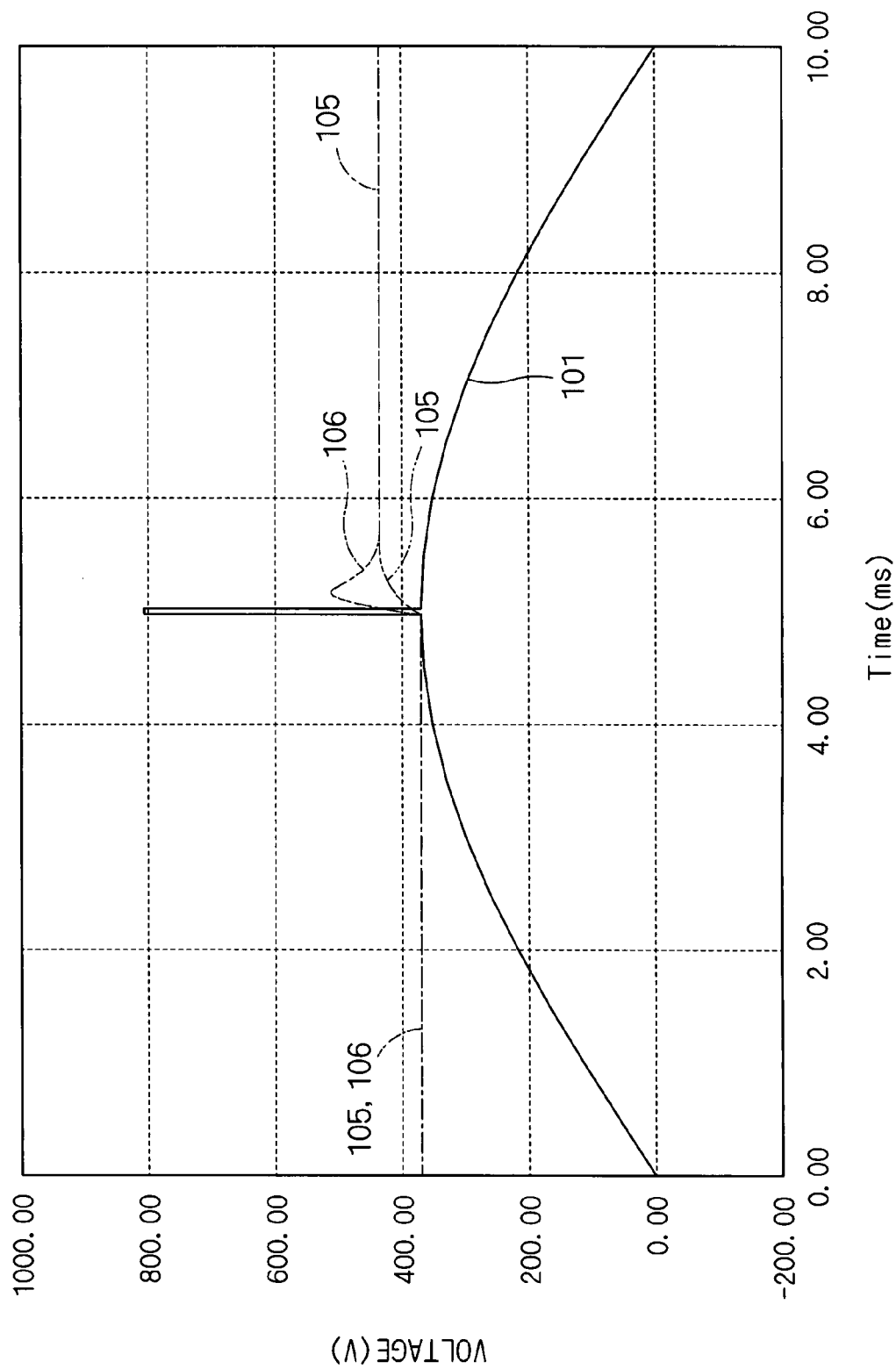
FIG. 9 is graph showing the operation in the second embodiment of this invention.

FIG. 9 is a graph showing the waveform 101 of the ac voltage $V_{in}$, a waveform 105 of the both-end voltage of the capacitor $C_s$, and a waveform 106 of the rectified voltage $V_{dc}$. The values having been described so far were employed as the specifications in the simulation, except that an inductance L of the inductor 32 was set at 300 μF. The inductance L is very small as compared the inductance (e.g., 6 mH) employed in the smoothing circuits 301 and 302 (shown in FIGS. 12 and 13, respectively).

It is understood that the peak value of the rectified voltage $V_{dc}$ at the occurrence of a lightning surge is lower than in the waveform 104 (FIG. 6) in the first embodiment in which only the bypass 33 is employed.

In the present embodiment, the capacitorless inverter control can also be performed with the capacitance C of the capacitor 31 significantly reduced. Further, the inductor 32 can be made smaller in size than the reactor LL employed in the smoothing circuits 301 and 302, which does not significantly run counter to size reduction of the intervening circuit.

As the inductor 32, the inductor group 20 (FIGS. 4 and 5) which serves as an interconnected reactor may be employed. This is because the inductors 21, 22 and 23 are also interposed in series to the capacitor 31 as viewed from the power supply system 1.

Third Embodiment

Figure 10:
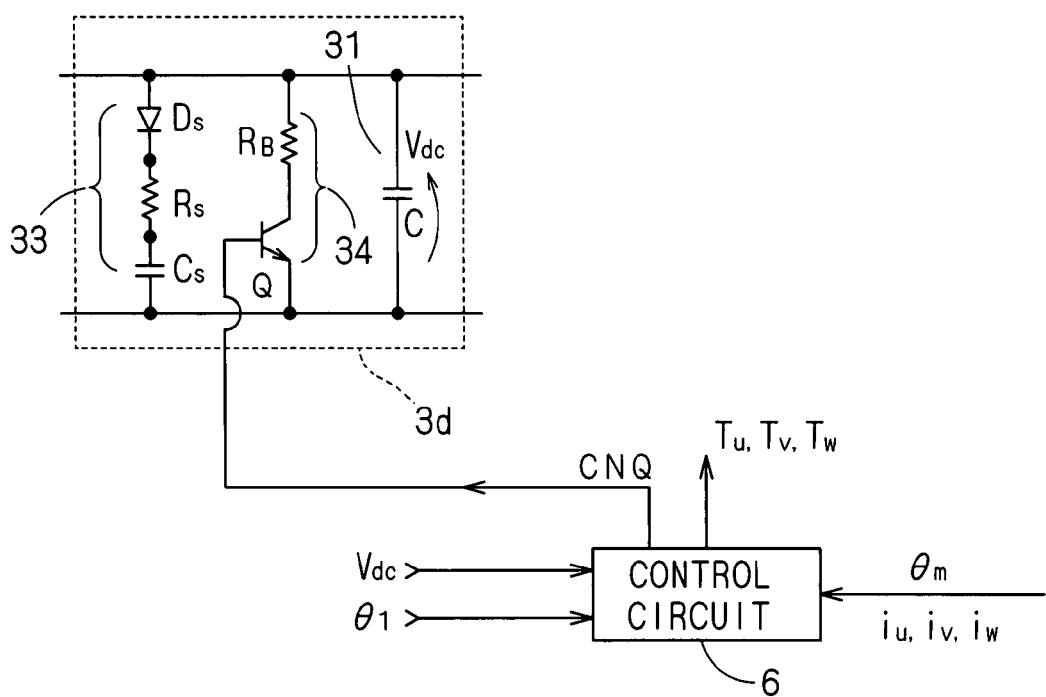
FIG. 10 is a circuit diagram showing part of a multiphase current supplying circuit according to a third embodiment of this invention.
Figure 11:
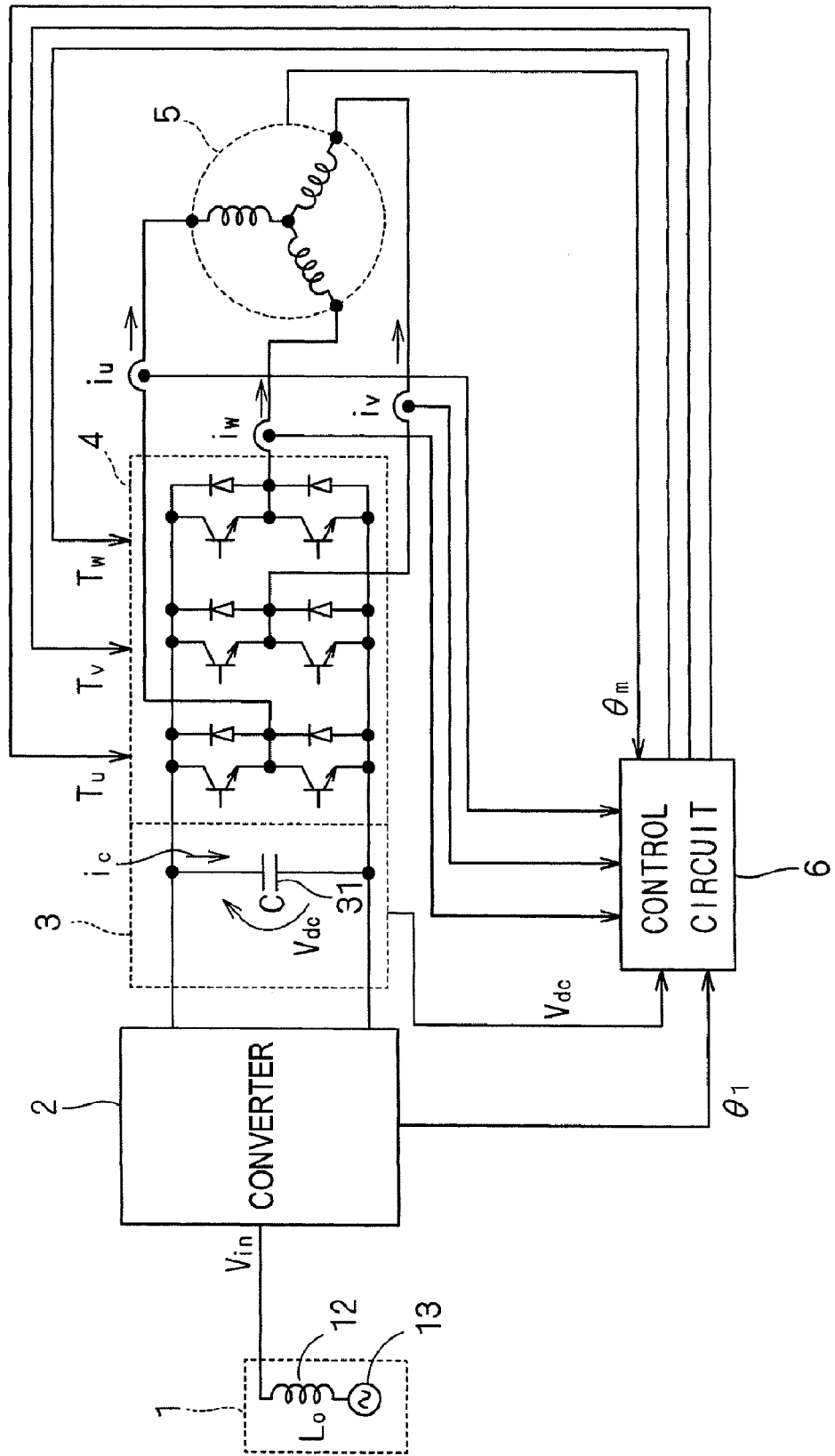
FIG. 11 is a circuit diagram illustrating a configuration of a conventional multiphase current supplying circuit.

FIG. 10 is a circuit diagram showing part of a multiphase current supplying circuit according to a third embodiment of this invention. The converter 2, inverter 4 and lightning arrester 7 are omitted, but are configured similarly to FIG. 1. In this embodiment, an intervening circuit 3d is employed in place of the intervening circuit 3a shown in FIG. 1.

The intervening circuit 3d is configured with a bypass 34 added in parallel to the capacitor 31 in the intervening circuit 3a described in the first embodiment using FIG. 1. The bypass 34 has a series connection of a transistor Q serving as a switching device and a resistor $R_B$.

The control circuit 6 supplies a bias voltage CNQ to the base of the transistor Q on the basis of the rectified voltage $V_{dc}$. When the rectified voltage $V_{dc}$ exceeds a first predetermined value, the transistor Q turns on, and when the rectified voltage $V_{dc}$ falls below a second predetermined value (this is lower than the first predetermined value), the transistor Q turns off.

Since the resistor $R_B$ is connected in parallel to the capacitor 31 when the rectified voltage $V_{dc}$ rises to exceed the first predetermined value in this manner, the speed of charging of the capacitor 31 can be decreased, and a rise in the rectified voltage $V_{dc}$ can be suppressed. When the rectified voltage $V_{dc}$ falls below the second predetermined value, the parallel connection to the capacitor 31 is canceled, which does not interfere with the operation of the capacitorless inverter in the normal operation.

As a matter of course, the bypass 34 may additionally be connected in parallel to the capacitor 31 and bypass 33 in the intervening circuit 3b shown in FIG. 8 as the modification of the second embodiment, or alternatively, may be provided in place of the bypass 33 in the intervening circuit 3b, and the bypass 33 may be omitted in the intervening circuit 3d.

The transistor Q is required to perform a high speed operation in order to cause the bypass 34 to efficiently operate against a lightning surge which varies at high speeds. A driving circuit and a lighting-surge detecting circuit also need to be provided accordingly. A power supply for activating such driving circuit and lighting-surge detecting circuit needs to be secured even when the inverter 4 is on standby. Therefore, employing the bypass 33 is more advantageous in terms of complicated configuration.

The above embodiments have been described taking, as an example, 270 V within about +10% variations of a 240V power supply with respect to a 200V system (varying from country to country within the range of 200 to 240 V) and taking, as an example, 600 V for a device breakdown voltage used in the circuit, and the effects of the embodiment have been disclosed. On the other hand, a device breakdown voltage of 1200 V can be taken as an example in a 400V system (varying from country to country within the range of 380 to 460 V) currently being employed in the three-phase power supply. In this case, problems caused by the lightning-surge-induced voltage rise can also be solved by the circuits disclosed in the present invention.

APPLICATION

The driving apparatus provided with the multiphase current supplying circuit according to the present invention and motor 5 supplied with the multiphase currents $i_u$, $i_v$, $i_w$ is capable of driving a compressor, for example. Such compressor is provided for an air conditioner, for example. The air conditioner employs a coolant for performing cooling or heating, and the coolant is compressed by the compressor.

While the invention has been described in detail, the foregoing description is in all aspects illustrative, and this invention is not limited thereto. It is understood that numerous modifications and variations not illustrated can be devised without departing from the scope of the invention.

The invention claimed is:

1. A multiphase current supplying circuit comprising:
a peak-value suppressor connected to an ac power supply outputting an ac voltage, the peak-value suppressing device suppressing a surge voltage superimposed on said ac voltage;
a converter receiving said ac voltage from said ac power supply via said peak-value suppressing device and rectifying said ac voltage;
a capacitor receiving an output of said converter;
a first bypass connected in parallel to said capacitor, said first bypass including a series connection of a resistive element and a capacitive element; and
an inverter receiving a both-end voltage of said capacitor and outputting multiphase ac currents.

2. The multiphase current supplying circuit according to claim 1, wherein
said first bypass further includes a diode connected in series to said resistive element and said capacitive element, and
a direction from an anode to a cathode of said diode coincides with a direction from a high potential side to a low potential side of said capacitor.

3. A multiphase current supplying circuit comprising:
a peak-value suppressor connected to an ac power supply outputting an ac voltage, the peak-value suppressing device suppressing a surge voltage superimposed on said ac voltage;
a converter receiving said ac voltage from said ac power supply via said peak-value suppressing device and rectifying said ac voltage;
a capacitor receiving an output of said converter;
a first bypass connected in parallel to said capacitor, said first bypass including a series connection of a diode and a capacitive element, and a direction from an anode to a cathode of said diode coinciding with a direction from a high potential side to a low potential side of said capacitor; and
an inverter receiving a both-end voltage of said capacitor and outputting multiphase ac currents.

4. A multiphase current supplying circuit comprising:
a peak-value suppressor connected to an ac power supply outputting an ac voltage, the peak-value suppressing device suppressing a surge voltage superimposed on said ac voltage;
a converter receiving said ac voltage from said ac power supply via said peak-value suppressing device and rectifying said ac voltage;
a capacitor receiving an output of said converter;
a first bypass connected in parallel to said capacitor, said first bypass conducting when a both-end voltage exceeds a first predetermined value and non-conducting when said both-end voltage falls below a second predetermined value not higher than said first predetermined value; and
an inverter receiving a both-end voltage of said capacitor and outputting multiphase ac currents.

5. The multiphase current supplying circuit according to claim 4, wherein
said first bypass includes a resistor and a switch connected in series to each other,
said switch turns on when said both-end voltage exceeds said first predetermined value, and
said switch turns off when said both-end voltage falls below said second predetermined value.

6. The multiphase current supplying circuit according to claim 4, further comprising a second bypass connected in parallel to said capacitor, wherein
said second bypass includes a series connection of a resistive element and a capacitive element.

7. The multiphase current supplying circuit according to claim 6, wherein
said second bypass further includes a diode connected in series to said resistive element and said capacitive element, and
a direction from an anode to a cathode of said diode coincides with a direction from a high potential side to a low potential side of said capacitor.

8. The multiphase current supplying circuit according to claim 4, further comprising a second bypass connected in parallel to said capacitor, wherein said second bypass includes a series connection of a diode and a capacitive element, and a direction from an anode to a cathode of said diode coincides with a direction from a high potential side to a low potential side of said capacitor.

9. The multiphase current supplying circuit according to claim 1, further comprising an inductor connected in series to the parallel connection of said capacitor and said first bypass.

10. The multiphase current supplying circuit according to claim 3, further comprising an inductor connected in series to the parallel connection of said capacitor and said first bypass.

11. The multiphase current supplying circuit according to claim 4, further comprising an inductor connected in series to the parallel connection of said capacitor and said first bypass.

12. The multiphase current supplying circuit according to claim 1, wherein said ac power supply is a single-phase ac power supply, said converter is a single-phase full-wave rectifying diode bridge, and a maximum value of said both-end voltage is not lower than twice a minimum value of said both-end voltage.

13. The multiphase current supplying circuit according to claim 1, wherein said ac power supply is a three-phase ac power supply, said converter is a three-phase full-wave rectifying diode bridge, and a minimum value of said both-end voltage is not higher than $3^{1/2}/2$ times a maximum value of said both-end voltage.

14. The multiphase current supplying circuit according to claim 1, wherein said ac power supply is a three-phase ac power supply, and said converter includes a three-phase active converter.

15. The multiphase current supplying circuit according to claim 14, further comprising an interconnected reactor interposed between said ac power supply and said active converter.

16. A driving apparatus comprising:

the multiphase current supplying circuit according to claim 1; and a motor supplied with said multiphase ac currents.

17. A compressor comprising the driving apparatus according to claim 16, said compressor being driven by said driving apparatus.

18. An air conditioner comprising the compressor according to claim 17, said air conditioner cooling or heating air using a coolant compressed by said compressor.

* * * * *